United States Patent Office 3,068,977
Patented Dec. 18, 1962

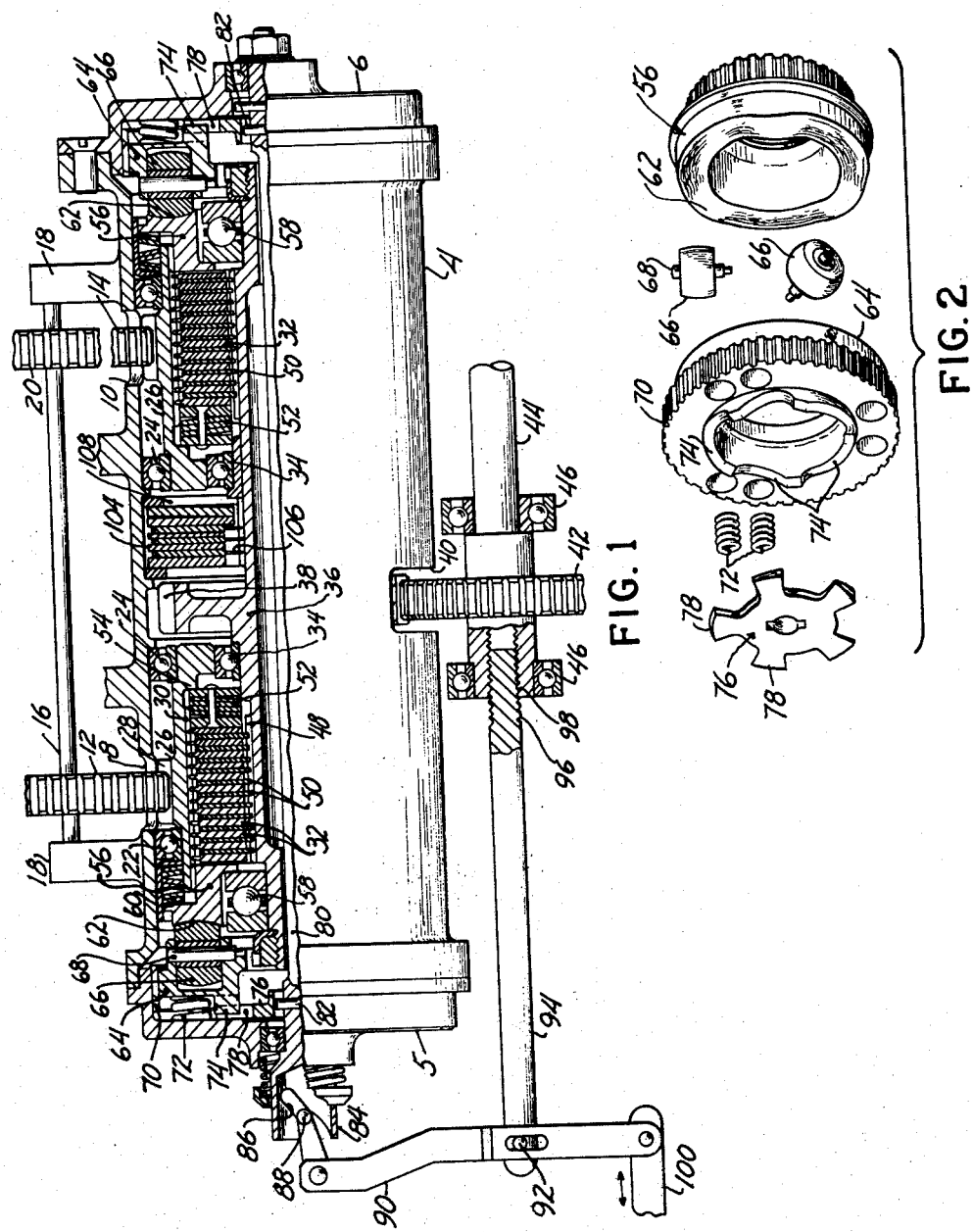

3,068,977
POWER SWITCHING MECHANISM
Daniel T. Cottone, Union City, N.J., assignor to Curtiss-Wright Corporation, a corporation of Delaware
Filed Mar. 9, 1959, Ser. No. 798,164
9 Claims. (Cl. 192—18)

This relates to a compact power switching mechanism by which power from a continuously operating source may be applied to a driven member in either forward or reverse directions, and in small, precise steps or increments at high frequency.

An object of the invention is to provide a power switching mechanism wihch is sensitive to small control input signals but which will transmit substantial amounts of power. A further object is to provide a power switching mechanism having extremely short time delay in transmitting desired amounts of power in response to small input signals and which further has short time delay in stopping power transmission upon fulfillment of the requirements of a control input signal. A further object is to provide a power switching mechanism, having rotational input and output elements, wherein power rotated output movement is proportional to duration or amount of an input signal. A further object is to provide a power transmitting mechanism of the character described in small and compact unitary form, yet which is capable of transmitting substantial amounts of power.

In general, the invention includes two power input members rotating in opposite directions, either of which is clutchable to a rotatable output or driven number through multiplate friction clutches. These clutches are engaged and disengaged by an intermittent triggering mechanism which responds to the actuation of a control input member calling for no rotation, forward rotation or reverse rotation of the output member. This triggering mechanism is so constructed that the input member inserts control signals intermittently when the mechanism is unloaded and is likewise disengageable when the triggering mechanism is unloaded. Driving action takes place when the triggering mechanism is intermittently loaded after the insertion of an input signal, and drive ceases when the triggering mechanism is unloaded, whereupon control signal insertion can be repeated or terminated.

A mechanism according to the invention is useful as a torque or power amplifier and as a power positioning device, wherein a movable load requires considerable power for its movement and wherein such load requires precise positioning. The invention of the mechanism permits a low energy positioning signal to be translated into a high energy signal for load movement. Large valves or aircraft components are typical devices with which a mechanism, according to the invention, is useful.

This mechanism produces powerful intermittent movements of the load, in small increments, which mode of operation, in many cases, is just as satisfactory as having the load moved in a continuous manner from point-to-point. A reasonable degree of design skill is required to choose the step movements so that they are of such magnitude that each step lies within the desired tolerances in the position of the driven load.

A better understanding of the details of the invention will be secured by reading the following detailed description in connection with the drawings in which FIG. 1 is predominantly a longitudinal section through a preferred arrangement of the invention and FIG. 2 is an exploded view of certain of the components of the invention which comprise the triggering mechanism.

The embodiment of the invention as shown in the drawings, while preferred, is susceptible to various detailed modifications and changes, some of which will be pointed out. The scope of the invention is defined in the annexed claims.

The mechanism comprises an essentially cylindrical housing 4, having end plates 5 and 6, and ports 8 and 10 through which pass driving gears 12 and 14. The gear 12 is carried on a shaft 16 journalled in pillars 18. Shaft 16 also carries a gear 20 meshed with gear 14, so that gears 12 and 14 rotate continuously in opposite directions. Shaft 16, or one of the gears 12 or 20 is driven by suitable power means not shown.

The mechanism within the left end of the housing 4 is essentially the same as the mechanism within the right end of housing 4 but it operates in the opposite rotational sense. The mechanism in the left end will be described in detail and the mechanism within the right end of the housing will be described briefly in respect to its functional difference from the mechanism in the left end.

Housing 4 carries ball bearings 22 and 24 whose inner races pilot a driving sleeve 26, externally formed in part as a gear 28 meshed with gear 12 and internally formed with splines 30 on which are slidably mounted a plurality of clutch plates 32. Sleeve 26 also carries a ball bearing 34 in which a full-length driven sleeve 36 is journalled. This driven member carries a central driven or output gear 38 meshed, through a port 40, with a final output gear 42 secured to an output shaft 44 which is journalled in bearings 46. Part of the driven sleeve 36 is externally splined at 48 and slidably mounted on the splines are a plurality of clutch plates 50 interleaved with the clutch plates 32. At the right end of the stack of clutch plates 32, 50 is a series of belleville washers 52 backed up by a shoulder 54 on the sleeve 26 which serves as a load limiter, enabling slipping of the plates 32 and 50 relative to one another in case the driven load is too stiff for the mechanism to turn it.

At the left end of the stack of plates 32, 50 is a pressure member 56, connected to the splines 30 to rotate therewith and limited as to its leftward movement by a thrust bearing 58. A series of belleville washers 60 is inserted between the pilot bearing 22 on the sleeve 26 and a shoulder on the pressure member 56, normally to load the pressure member 56 against the thrust bearing 58 and to hold said member in a leftward direction out of engagement with the clutch plates 32 and 50. The leftward face of the member 56 is formed as an annular waved cam 62. It will be noted that the member 56 rotates with the driving sleeve 26. To the left of the cam 62 is an annular element 64 in which are journalled one or more rollers 66 on journal pins 68. The member 64 is constrained from rotation relative to the housing end 5 by splines 70. Between the housing end 5 and the annular member 64, a plurality of light springs 72 are inserted to press the member 64 rightwardly and to hold the rollers 66 in continuous rolling contact with the annular waved cam 62 on the member 56. The inner portion of the left face of the annular member 64 is formed with a series of sloped ramps 74. Between these ramps and the housing end 5, a blocking member 76 is disposed, this blocking member comprising a number of radially projecting prongs 78 which are rotatable in limited amount so that they may either lie between the deepest parts of the ramps 74 and the housing end, or between the highest parts of the ramps 74 and the housing end or at any position between.

The blocking member 76 is keyed to a control input shaft 80 at 82. Rotation of the control input shaft moves the prongs 78, at times, to any one of the several positions described.

In the operation of this part of the device, the drive sleeve 26 rotates continuously and as it rotates the pressure member 56 and the cam 62 rotate with it. This enforces reciprocation of the annular member 64 toward and away from the clutch plates 32, 50. The pressure member 56 is normally held in a single axial position while it rotates, through the action of the belleville springs 60 which, as described, press the pressure member 56 against the stop afforded by the thrust bearing 58. Concurrently, the member 64 reciprocates through action of cam 62 on rollers 66. When power is not being transmitted, the prongs 78 of the blocking member 76 lie in opposite deep portions of the ramps 74 on annular member 64, and have slight clearance relation with the bottoms of the ramps 74 when the ramps (FIG. 1) are reciprocated to their extreme leftward position. These ramps will move from this extreme position to a rightward extreme position where there is clearance between the prongs 78 and the top of the ramps 74. When the ramps and member 64 are in their most rightward position, the blocking member 76 may be turned counterclockwise (FIG. 2) so that the prongs 78 underlie higher portions on the ramps 74. Then, when the annular member 64 moves leftwardly, the prongs 78 engage the ramps 74 and stop any further leftward movement thereof. Thus, rightward movement of the pressure member 56 is enforced by cam action, against the springs 60, forcing the clutch plates 32, 50 into frictional driving engagement. This imparts rotation from the driving sleeve 26 to the driven sleeve 36 and rotates the output gear 42. This clutch engagement and rotation is intermittent, occurring only when the high points on the cam 62 are pressed by rollers 66, and when the ramps 74 are blocked by prongs 78. Clutching pressure is relieved when low points on the waved cam come opposite the rollers 66, when the blocking effect of the blocking member 76 is relieved, enabling its movement to a new position, either in the direction to terminate or to repeat rotation of the output member.

Thus, it will be seen when clutch engagement is called for by the blocking member 76, there may be a repeated number of power pulses caused by clutch plate engagement, until the blocking member 76 is rotated during unloaded intervals to unblock member 64 and to terminate driving of the output sleeve.

Signal input and position follow-up for the mechanism is provided by the following components. The left end of the input shaft 80 is enlarged to comprise a sleeve 84 having a helical slot 86 therein. This slot is engaged by a pin 88 on a lever 90, the lever being pivoted at 92 to a shaft 94. This shaft is threaded at its rightward end as at 96, the threaded part of the shaft engaging internal threads 98 formed within a portion of the shaft 44. The lever 90, at its lower end is pivoted to a link 100 which is selectively shiftable in a horizontal direction as shown to call for rotation of the output shaft 44. Assuming the system to be in the attitude for no output rotation, the input link 100 may be moved to the left whereby the lever 90, pivoting on the pin 92, moves the pin 88 rightwardly. This turns shaft 80 away from the viewer and moves the blocking member prongs 78 under elevated portions of the ramps 74 when the latter reciprocate in a rightward direction. As described, this causes engagement of the clutch plates 32, 50 as the member 64 is blocked, forcing member 56 rightwardly, and rotates the driven sleeve 36 and the output gear 42. As the output gear 42 rotates, the threads 96, 98 will cause the shaft 94 to move leftwardly which, in turn, backs the pin 88 leftwardly to restore the blocking prongs 78 to a "no signal" position. Thus, the mechanism follows the demand of the signal input 100 to cause rotation of the output member until the signal required is fulfilled in rotation of the output member. Thereupon any further signals can be reimposed.

To this point only the leftward end of the mechanism has been described, this leftward end enabling output rotation of gear 38 away from the viewer. The clutch and triggering mechanism are duplicated on the right end of the mechanism as shown to enable rotation of the output members 36, 42, and 44 toward the viewer, in the opposite direction from that already described in detail. Those elements of the right end of the mechanism which are identical to those described, bear the same reference characters. The right end blocking member prongs 78 and the ramps 74 are disposed so that rotation of the input signal shaft 80 toward the viewer (clockwise in FIG. 2) will introduce the blocking prongs 78 under high points of the ramps 74, to cause engagement of the right end clutch plates 32, 50. The slot 86 in the member 84 is helical and is of such length that when the pin 88 is midway along it, shaft 80 is positioned so that both left prongs 78 and right prongs 78 lie opposite deep parts of their respective ramps 76. Pin 88 movement to the left turns shaft 80 toward the viewer. This will not affect the left end triggering mechanism, but will operate the right end mechanism. Pin 88 movement to the right turns shaft 80 away from the viewer. This will not affect the right end triggering mechanism, but will operate the left end mechanism.

The term, triggering mechanism, has been used above in connection with the assembly shown in FIG. 2, namely, the rotating member 56 and its waved cam 62, the annular member 70, the ramps 74 and the blocking member 76.

To enable the position of the output shaft 44 to be held firm while there is no signal input to the power transmitter, a series of brake plates 104 and 106 are respectively splined to the inside of the housing 4 and to the mid-portion of the driven sleeve 36. These brake plates are spring loaded toward one another by a belleville spring 108. This spring provides limited load on the brake, and is designed for a brake slipping torque slightly above the greatest reverse load torque which might be applied to the output shaft 44, the slipping torque being of a value which is well below the power transmitting torque of the clutch plates 32, 50. When the clutch plates are engaged they serve both to drive the load through the shaft 44 and to slip the brake plates 104, 106. If no load reversal is expected in the output shaft 44, the slipping torque of the brake may be made very low, or the brake may be omitted entirely.

In the design of prongs 78 and ramps 74, the surfaces of each should be roughened or serrated to prevent relative slip underload, particularly when the ramp angles are steep. The sloped ramps provide modulating clutch control. That is, the engagement dwell of the clutches is a function of the position of prongs 78 relative to ramps 74. If a non-modulating control is desired, the ramps 74 can be modified to a stepped configuration, wherein the prongs 78 are positioned either for no clutch engagement, or for full clutch engagement dwell for each cycle of movement of cam 62 relative to rollers 66. Frequency of clutch engagements are variable both as a function of input speed to the mechanism, and as a function of the number of lobes on the cam 62.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention.

What is claimed is:

1. A power transmitter comprising a housing containing a driving rotating input member, a driven output member rotatable at times with said input member, clutch plates rotatable with respective members and axially shiftable into engagement with one another to enforce said output member rotation, cam means continually driven by said input member, an element secured against rotation to said housing and continually reciprocated toward and away from said clutch plates by said cam means at a frequency proportional to input member speed, said means being mounted for bodily movement toward and away from said plates while reciprocating, an abutment on said housing, and an element selectively movable between said abutment and said reciprocated element, which, when so moved, blocks said reciprocated element and enforces it to engage said clutch plates intermittently during subsequent reciprocations.

2. A power transmitter according to claim 1, including feedback means driven by said output member connected to said selectively movable element for moving same to an unblocking position relative to said reciprocated element.

3. A power transmitter according to claim 1, including a friction brake between said housing and said output member, operable to stop rotation of said output member upon disengagement of said clutch plates.

4. A power transmitter comprising a driving rotating input member, a driven output member rotatable at times with said input member, clutch plates rotatable with respective members and axially shiftable into engagement with one another to enforce said output member rotation, means continually driven by said input member comprising a waved cam, a cam follower facing said cam, axially movable by said waved cam during its rotation, said cam follower being constrained from rotation, resilient means urging said cam follower toward said cam whereby the follower reciprocates as a result of rotation of said cam, said waved cam being arranged for axial movement to engage said clutch plates at times, a ramp on the side of said cam follower remote from said cam, a controllable blocking element movable rotationally into the path of reciprocation of said ramp, and an abutment backing up said blocking element, whereby, when said blocking element is in the path of said ramp, said cam follower enforces reciprocative movement of said waved cam to engage said clutch plates.

5. A power transmitter comprising a driving rotating input member, a driven output member rotatable at times with said input member, clutch plates rotatable with respective members and axially shiftable into engagement with one another to enforce said output member rotation, means continually driven by said input member comprising a waved cam, a non-rotating but axially movable cam follower, said cam being movable axially at times to engage said clutch plates with one another, elastic means urging said cam and follower into engagement with each other, and blocking means controllably movable into engagement with said cam follower, for the purpose of stopping reciprocation thereof and enforcing reciprocation of said cam to enforce clutch plate engagement during relative rotation of said cam and follower.

6. A power transmitter according to claim 5, wherein said cam follower comprises an annular member having a roller journalled therein for rolling engagement with said waved cam.

7. A power transmitter comprising a driving rotating input member, a driven output member rotatable at times with said input member, clutch plates rotatable with respective members and axially shiftable into engagement with one another to enforce said output member rotation, an annular member driven rotationally by said input member and mounted for axial movement, a second non-rotating annular member matched with the first annular member, said two members being relatively formed to enforce relative reciprocation thereof during relative rotation thereof, resilient means holding said annular members toward mutual engagement and urging them jointly toward a position for clutch plate engagement, and blocking means selectively movable into engagement with said second annular member to block reciprocative movement thereof, and thus to enforce reciprocative movement of said first annular member in turn to enforce clutch plate engagement.

8. A power transmitter according to claim 7 including means responsive to output member movement and connected thereto for moving said blocking means away from engagement with said second annular member.

9. A power transmitter according to claim 7 wherein said blocking means is movable into and out of blocking position freely, at intervals when said two annular members are closest to one another during relative reciprocation thereof.

References Cited in the file of this patent

UNITED STATES PATENTS

| 2,384,044 | Poorman | Sept. 4, 1945 |
| 2,827,994 | Tiedeman | Mar. 25, 1958 |
| 2,903,108 | Ochtman | Sept. 8, 1959 |